(12) United States Patent
Luo et al.

(10) Patent No.: US 7,653,940 B2
(45) Date of Patent: Jan. 26, 2010

(54) TRACING AND IDENTIFYING PIRACY IN WIRELESS DIGITAL RIGHTS MANAGEMENT SYSTEM

(75) Inventors: Lin Luo, Beijing (CN); Jian Zhang, Shanghai (CN); Rong Yan, Beijing (CN); Ling Shao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 11/211,804

(22) Filed: Aug. 25, 2005

(65) Prior Publication Data
US 2006/0048237 A1   Mar. 2, 2006

(30) Foreign Application Priority Data
Aug. 27, 2004   (CN)   .................. 2004 1 0057953

(51) Int. Cl.
*G06F 12/14* (2006.01)
*G06F 12/16* (2006.01)
*G06F 7/04* (2006.01)
(52) U.S. Cl. .................................. 726/22; 726/32
(58) Field of Classification Search ............. None
See application file for complete search history.

(56) References Cited

U.S. PATENT DOCUMENTS 5,920,861 A   7/1999   Hall et al. .................. 707/9

(Continued)

OTHER PUBLICATIONS

D. Boneh et al. "Collision-Secure Fingerprinting for Digital Data," IEEE Transactions on Information Theory, vol. 44, No. 5, Sep. 1998, pp. 1897-1905.*

(Continued)

*Primary Examiner*—Kaveh Abrishamkar
(74) *Attorney, Agent, or Firm*—Steven Chiu (57) ABSTRACT

Provides methods for tracing and identifying a piracy in a wireless rights management system, wherein the content provider allow the protected digital content to be super-distributed, when unauthorized holding a pirated copy of the protected digital content is detected, based on the gateway controlling ability of the wireless operator within the wireless digital rights management system, a specific fingerprint is embedded in or removed from the protected digital content so as to trace the suspected persons and further identify the pirate. The fingerprint is related to information of a suspected person holding the protected digital content without authorization. A process of screening singles out highly suspected persons. Therefore the operator can determine whether the suspected person is a real pirate by comparing the similarity of the pirated version of content and the version held by the suspected person, and the exact tracing and identifying is achieved.

20 Claims, 3 Drawing Sheets

U.S. PATENT DOCUMENTS

| | | | | |
|---|---|---|---|---|
| 6,112,181 | A | 8/2000 | Shear et al. | 705/1 |
| 6,636,966 | B1 | 10/2003 | Lee et al. | 713/165 |
| 6,912,315 | B1* | 6/2005 | Wong et al. | 382/232 |
| 7,006,631 | B1* | 2/2006 | Luttrell et al. | 380/217 |
| 7,424,747 | B2* | 9/2008 | DeTreville | 726/32 |
| 2003/0026422 | A1* | 2/2003 | Gerheim et al. | 380/210 |
| 2003/0095660 | A1* | 5/2003 | Lee et al. | 380/231 |
| 2003/0152234 | A1* | 8/2003 | Matsushita | 380/277 |
| 2004/0059933 | A1* | 3/2004 | Levy | 713/200 |
| 2004/0133794 | A1* | 7/2004 | Kocher et al. | 713/193 |
| 2005/0251486 | A1* | 11/2005 | Nair | 705/57 |
| 2005/0289064 | A1* | 12/2005 | LeComte et al. | 705/51 |

OTHER PUBLICATIONS

B. Chor et al., "Tracing Traitors", IEEE Transactions on Information Theory, vol. 46, No. 3, May 2000, pp. 893-910.*

Silverberg et al., "Applications of List Decoding to Tracing Traitors," IEEE Transations on Information Theory, vol. 49, No. 5, May 2003, pp. 1312-1318.*

Pfitzmann et al., "Asymmetric Fingerprinting for Larger Collusions", ACM Press 1997, pp. 151-160.*

* cited by examiner

TRACING AND IDENTIFYING PIRACY IN WIRELESS DIGITAL RIGHTS MANAGEMENT SYSTEM

TECHNICAL FIELD OF THE INVENTION

The present invention relates to Wireless Digital Rights Management (DRM) technology, and more specifically, to a method for tracing and identifying piracy in a wireless digital rights management system.

BACKGROUND OF THE INVENTION

Wireless Digital Rights Management (DRM) technology provides a technical solution based on remote certification, digital watermark (finger print), algorithm encryption technologies for the protection of digital contents like text, image, music, or media files, which are broadcasted online over network.

Effective DRM solution allows a digital content provider of network to control access authorization for browsing and reading digital contents, no matter whether the contents are text, music, image or other media files. DRM solution ensures that only legal authorized users can own corresponding rights. Each authorized user, after paying for certain charges, will get an exclusively corresponding user ID and password as well, and will be given a granted terminal media player that is corresponding with the encryption algorithm.

In order to trace the piracy, in the traditional DRM system, in response to the digital content request from the users, i.e. digital format media files like text, music, image, the Piracy Tracing Method uses digital fingerprint technology to send a copy of the requested contents to the requesting user. Wherein said copy is embedded with a fingerprint corresponding to user information and forms into a different version of the same contents. To avoid reproducing the unauthorized copy and its releasing, the digital content provider would embed IDs or serial number of different users as various fingerprints in legal copy of the contents (this can be realized with watermark technology). When piracy occurs, the version and source of piracy can be identified by restoring the fingerprint from the pirated copy and therefore the user that is related to said fingerprint can be found out so as to identify the pirate(s). The procedure for how to discover a piracy would be not discussed in this application.

Unlike traditional DRM system in which the protected contents are distributed from a provider to end-users, the wireless DRM system has its unique features, i.e. the content providers wish that their digital contents protected by encryption could be broadcasted in the form of a super-distribute. The content providers hope that more legal users can obtain various digital media contents they provided. To be more specific, after the content providers have provided their digital contents to a group of users (hereinafter called the first level users), the content providers also hope that the first level users can redistribute the protected contents they received to other users (hereinafter called the second level users) in a legitimate way. Therefore the digital contents can be distributed more extensively. When the first level users redistribute the content to the second level users, before receiving the contents, the second level users also need to obtain authorization and become legal users to be able to use the contents normally. Similarly, the second level users can further redistribute the contents to third level users. Therefore, the content providers can make a profit by charging the legal users from multiple redistributions of their contents. Under the circumstance of the redistribution (or Super-Distribution Mode), the users are encouraged to further super-distribution the protected contents they received in a legitimate way. In the current wireless DRM system, the copyright protection of the digital contents relies on the publishing by the users (namely the legal right objects) who receive/use the protected contents. However, this super-distribution mode makes it impossible for the traditional piracy tracing method to effectively spot the users who disclose the protected contents. To be more specific, if the pirated contents (disclosed contents) are disclosed by the first level users, the current DRM technology, by restoring the fingerprint from the pirated contents to determine the source of the piracy, could find out the users related to the fingerprint mentioned and identify the pirates (leaking point). However, after multiple redistributions through super-distribution, if the pirated contents are disclosed by the second level users or the third level users and even the further lower level users, the current DRM technology can only locate the pirates in the first level users because the redistributed contents only contains the fingerprints related to the first level users. When the pirates appear in the second level users or in the third level users, it is impossible to specifically identify the leaking point of the digital contents in the wireless DRM system.

Robust DRM system should be able to endure hacker's attack. This means the system should be able to uphold the attack from hackers and identify the hackers. The latter is the so-called piracy tracing. Only through effective tracing can the operator take measures either to delete the hacker's account or sue the hacker. But the current technology DRM System is unable to effectively, accurately identify the pirates or hackers. Therefore, it is unable to prevent from piracy effectively.

SUMMARY OF THE INVENTION

In order to solve the problems mentioned above, one aspect of the present invention is to make further improvement on the prior art digital rights management system and to provide an efficient and accurate method for tracing and identifying piracy in the wireless digital rights management system.

Another aspect of the present invention is to make use of the control power of the wireless operator to conduct specific tracing of persons suspected to have leaked or to who is forwarded the protected digital contents or of persons who receive contents from suspected person, so that provide a method for tracing and identifying accurately the piracy in a wireless digital rights management system.

A further aspect of the present invention is to further enhance the efficiency of tracing and identifying the piracy in the wireless digital rights management system. Firstly by means of screening those being suspected and then using an exclusive tracing technique according to the present invention for those highly suspected, it is possible to narrow the range of the suspects and it is likely to identify the pirates or leaking points more efficiently.

According to the present invention, a method for tracing and identifying a piracy in a wireless digital rights management system is provided. Wherein the content provider delivers protected content in a super-distribution mode, the method comprising: when unauthorized holding a pirated copy of the protected digital content is detected, based on the gateway controlling ability of the wireless operator within the wireless digital rights management system, a specific fingerprint is embedded in or removed from the protected digital content so as to trace the suspects and further identify the pirate, wherein said specific fingerprint being related to the information about the suspect who holds the protected digital content without authorization.

BRIEF DESCRIPTION OF THE DRAWINGS

The features, advantages as well as the benefits of the present invention will become more apparent from the following description taken in conjunction with the accompanying drawings, in which.

DETAILED DESCRIPTION OF THE INVENTION

The present invention provides improvement to digital rights management systems, and provides efficient and accurate methods for tracing and identifying piracy in the wireless digital rights management system. The present invention also makes use of the control power of a wireless operator to conduct specific tracing of persons suspected to have leaked or to whom is forwarded the protected digital contents or of persons who receive contents from a suspected person, and provides methods for tracing and identifying accurately the piracy in a wireless digital rights management system.

The present invention further enhances the efficiency of tracing and identifying the piracy in a wireless digital rights management system. Firstly by means of screening those being suspected and then using an exclusive tracing technique according to the present invention for those highly suspected, it is possible to narrow the range of the suspects and it is likely to identify the pirates or leaking points more efficiently.

According to the present invention, a method for tracing and identifying a piracy in a wireless digital rights management system is provided. Wherein the content provider delivers protected content in a super-distribution mode, the method comprising: when unauthorized holding a pirated copy of the protected digital content is detected, based on the gateway controlling ability of the wireless operator within the wireless digital rights management system, a specific fingerprint is embedded in or removed from the protected digital content so as to trace the suspects and further identify the pirate, wherein said specific fingerprint being related to the information about the suspect who holds the protected digital content without authorization.

Advantageously, the method further includes: when wireless operator gateway in which the content provider is located or to which the content provider is related, receives the protected digital content to be forwarded, judging whether the sender or recipient of the forwarded content is a suspected person based on the fact whether the sender or recipient of the forwarded content holds a corresponding version of the pirated digital content; when the recipient of the digital content is a suspected person, the gateway in which the content provider is located or to which the content provider is related embeds a fingerprint in the digital content that is related to said suspected person as the recipient; when the sender of the forwarded digital content is a suspected person, the gateway in which the content provider is located or to which the content provider is related removes the embedded fingerprint from the digital content which is related to the suspected person as the sender; and identifying the pirate who leaks the content based on the tracing of content version that contains the fingerprint related to the suspected person. Thus the accurate tracing and identifying method is realized Advantageously, the method for tracing and identifying a piracy according to the present invention further comprising: screening all of the suspected persons who hold the pirated digital content to determine one or more highly suspected persons who are most likely to leak the digital content. Thus special tracing is only taken on the highly suspected persons. By so doing, it is more efficient to identify the pirate or leaking point. To most of the general users, there is no significant additional work in the system operator side. Therefore, it saves a lot of resources.

Figure 1:
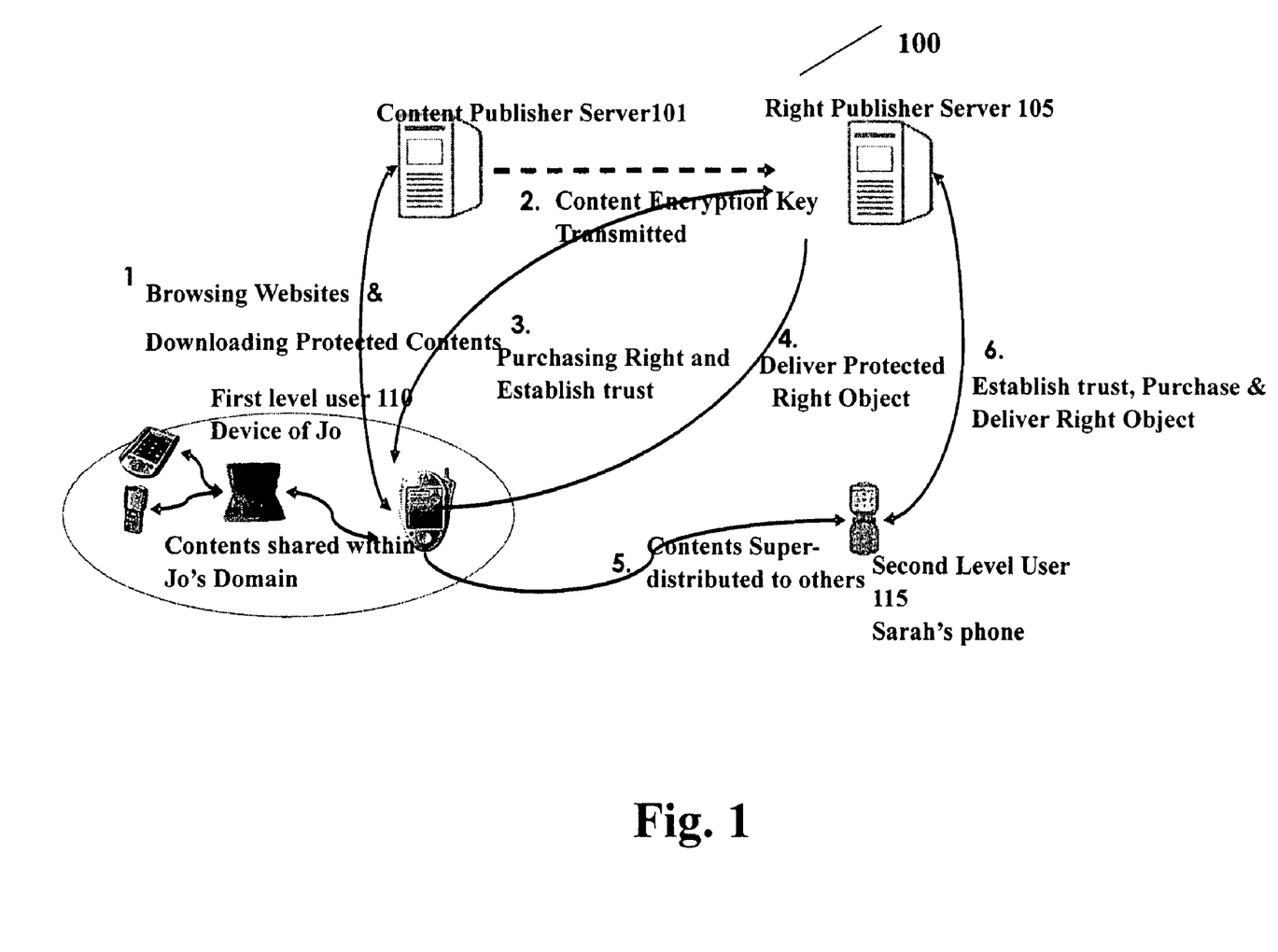
FIG. 1 illustrates a wireless DRM system with super distribution mode.

An advantageous embodiment of the present invention will be described with reference to the accompanying drawings. FIG. 1 is the system based on the Open Mobile Alliance System. FIG. 1 illustrates the Super-Distribution Mode of the wireless DRM system 100 according to the present invention. The DRM System 100 comprises at least one content publisher server 101 for publishing protected digital contents provided by content providers. The digital contents comprise, but are not limited to, text contents, music, image or other multimedia stream and the contents are the protected contents provided by content providers using various encryption methods. Normally, the DRM system allows digital contents to be distributed in the form of encryption and utilizes existing Internet transfer protocols like TCP/IP, SSL, HTTP, etc., as well. By means of associating a group of rights with each individual content respectively and only after obtaining the right to access the protected digital contents, can the user decrypt the content. The encryption methods adopted by the content provider include, but are not limited to, Symmetric Key Cryptography (e.g., AES, DES, etc) and Asymmetric Key Cryptography (e.g., RSA, etc). A plurality of user equipments 110 communicate with the content publisher server 100 via wireless or wireline, browse various digital contents provided by said content publisher server and download requested protected contents from the content publisher server. FIG. 1 only shows one of the users that directly communicates with the content publisher server, i.e. Jo. It should be understood that users that can directly communicates with the content publisher server may be many and the equipments held by the users include, but are not limited to, wireless or wireline equipments, like PDA (Personal Digital Assistant), computer, mobile phone, set-top box and digital TV, etc. In a DRM system, directly decrypting the contents by users is usually prohibited. The protected contents can only be re-displayed by specific media player/browser. After the user equipment 110 decrypted the content provided by the content publisher sever 101, the decrypted digital contents downloaded from the content publisher server 101 can be shared among all the equipments held by the user, i.e. PDA (personal digital assistant), computer, mobile phone, set-top box and digital TV, etc.

After downloading the protected digital contents with user equipments from the content publisher server 101, the user is not usually able to browse the contents normally. It is further required authorization. Under such circumstance, while the user equipment downloading the protected digital contents from the content publisher server 101, the content publisher server 101 will send a key corresponding to the encryption of the protected digital contents to a right publisher server 105. User equipment 110, by sending request and purchasing the key from the right publisher server 105, establishes trust between the right publisher server and the user equipment. Then the user can be authorized to use and read the protected digital contents. In FIG. 1, the content publisher server 101 and the right publisher server 105 illustrated are separated. However, in practice, one single server can be used to realize the functions of the two servers.

In a wireless DRM system, the content publishers usually encourage the authorized users to further forward the digital contents that they are authorized to use. Under such circumstances, each of first level users, like Jo, who has been authorized to use the protected digital contents provide by said content publisher server 101 may forward the content to others, i.e. Sarah via wireless or wireline, wherein the users who receive the forwarded digital contents firstly are called the second level users. The second level users obtain the right to use the forwarded contents by sending a request and purchasing right from the right publisher server and establish trust between the second level users and the right publisher server. Similarly, the second level users can further forward the digital contents they are authorized to use to the third level users. And the third level users may obtain the right to use the protected digital content and establish trust between the third level users and the right publisher server by sending a request and purchasing right from the right publisher server. Therefore, the protected digital content can be distributed to multilevel users. Thus so called Super-Distribution model is established in this way.

In addition, as mentioned above, in order to trace piracy, in DRM system, for the digital content requested by the users, i.e. text, music, image in the digital form and other multimedia files, the piracy tracing method uses digital fingerprint technology to send a copy of the requested contents to the requesting user. The fingerprint related to the user (first level user) is embedded in the copy so as to form different versions of the same content.

From the description of the Super-Distribution Mode of the currently used wireless DRM system 100, it can be learned that, during the forwarding of the content at each time, the forwarded protected digital contents are only embedded with the fingerprint of the first level users. When the protected digital content is used by unauthorized users, or in another word, when piracy occurs, since the forwarded content only contains the fingerprint information related to the first level users, the pirate(s) can only be located among the first level users. Based on existing technologies, it is impossible to identify the pirates when piracy occurs among the second, third or even lower level users. Therefore, it is impossible to exactly know the exact leaking points of the piracy.

Similar to the traditional tracing system, the present invention requires the content distributor to deliver different copies of the contents (with different fingerprint embedded in the contents therein) to different users. Similarly, these users can re-distribute the contents to other users. In another word, the first level users who directly receive the contents from the content publisher server will receive a unique version embedded with the unique fingerprint information related to the first level users. In addition, alternatively, specific fingerprint can be embedded in the redistributed contents in advance and the users of the first level can share the same version when the contents are distributed.

In order to trace and identify the pirate in Super-Distribution Mode, the present invention provides a method for tracing and identifying a piracy in a wireless digital right management system. For this sake, based on the prior art, the present invention utilizes the gateway's controlling of the forwarded content to trace and identify the piracy accurately.

According to the method for tracing and identifying a piracy in a Wireless DWM provided by the present invention, the present invention utilizes the operator gateway's controlling ability for the super-distributed contents to trace and identify the pirated contents.

Firstly, to explain the basic principles adopted by the method for tracing and identifying a piracy of the present invention.

1. When delivering protected digital contents in a Super-Distribution mode, based on the wireless operator's gateway controlling ability in the wireless DRM system, specific fingerprint is embedded in or removed from the protected digital contents being delivered so as to trace suspects and then further identify each leaking person, wherein the specific fingerprint is related to the suspect's information.

2. Based on point one above, if the suspects are large in number, the present invention further puts forward a initial screening process to conduct filtering for the multiple suspects in order to narrow the range of the suspects before the implementation of the special tracing process. Therefore, the highly-cost special tracing is only required for a small group of suspects (highly suspected persons). For the majority of clients, no significant additional work is needed at system operator's side.

Figure 2:
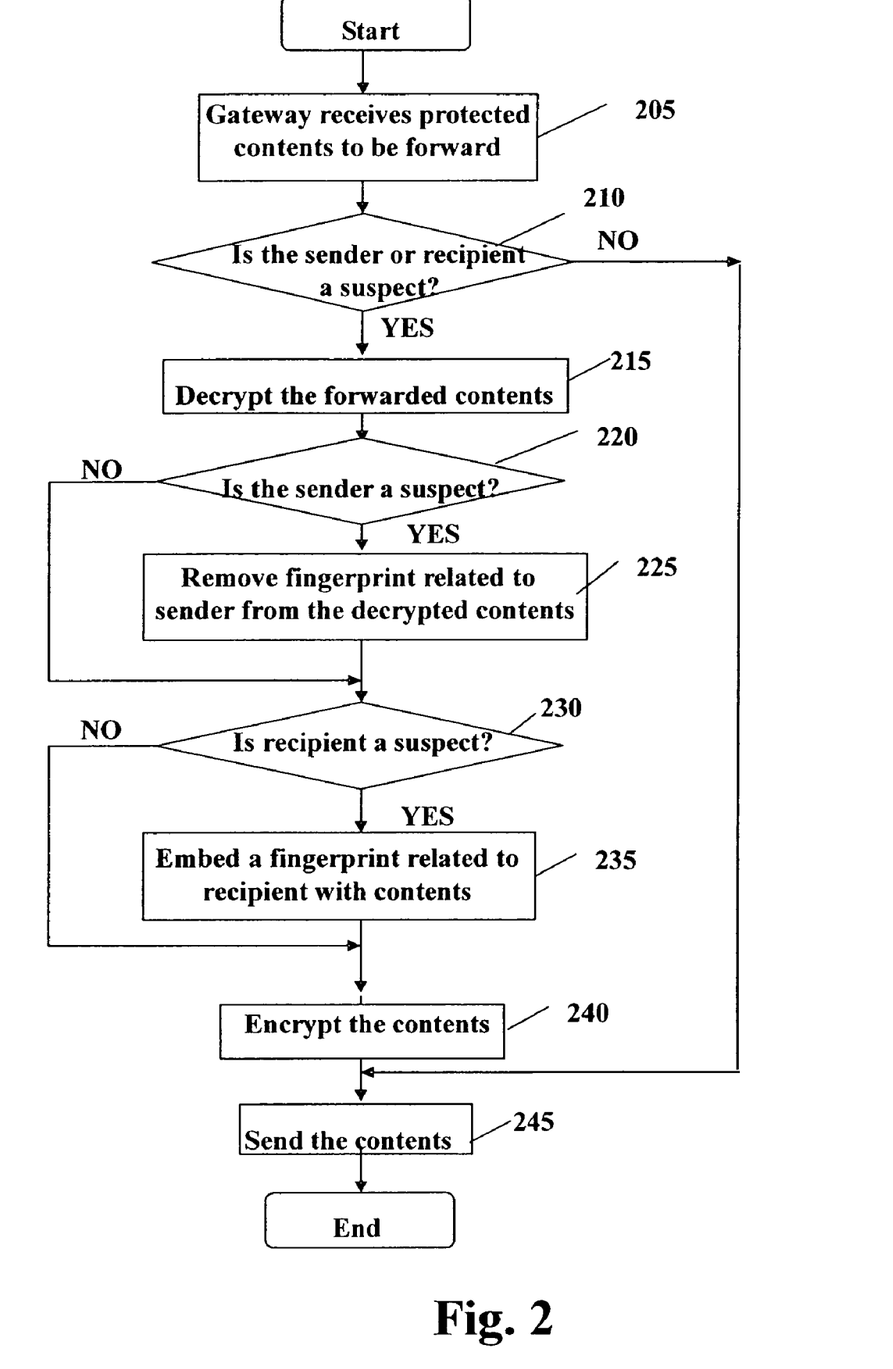
FIG. 2 illustrates a flowchart of the special identifying method for locating pirates according to the present invention.
Figure 3:
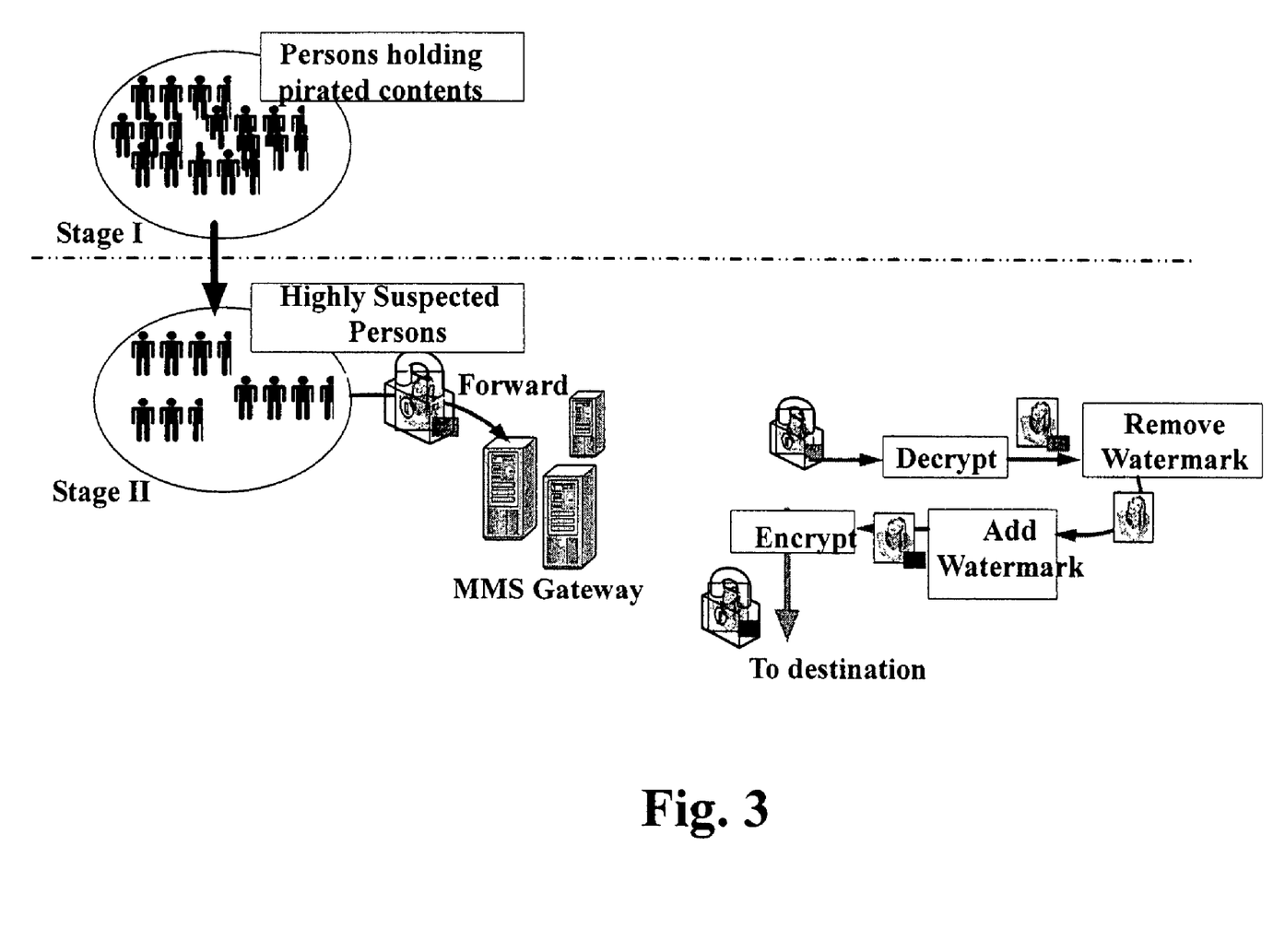
FIG. 3 is shows an advantageous example of the method for tracing and identifying a piracy in the wireless digital rights management system according to the present invention.

The following is a detailed description of the method of the present invention with reference to FIG. 2 and FIG. 3. Hence the advantages, benefits and other features of the present invention will become more evident. FIG. 2 illustrates the method for tracing and identifying pirated contents in accordance with the present invention. Specifically, it is shown in FIG. 2 that when pirated digital content is detected, the special piracy tracing process in accordance with the present invention is conducted to perform piracy tracing with respect to the digital contents transmitted thereafter. According to the present invention, when piracy occurs, based on the record for the forwarded content passing through the wireless delivering gateway of the operator beforehand, it is possible to judge persons who hold the same version of the pirated contents and then said persons are determined as suspects. Then, special tracing will be taken on the contents forwarded to the suspects or the contents forwarded by the suspects.

In the exemplary flowchart of FIG. 2, at step S205, the gateway server will receive the protected digital contents to be forwarded. Wherein the digital contents received by the gateway server will be protected after being encrypted using various encryption methods, such as Symmetric Key Cryptography, Asymmetric Key Cryptography, etc. Particularly, the digital contents received by the gateway server are embedded with the fingerprint related to the first level users as what is embedded in the content when the content provider provides the protected content to the first level users; in addition, alternatively, specific fingerprint can be embedded in the digital content in advance so as to form different versions of the contents and different users of the first level can share one of versions therein. The gateway server, for example, can be the gateway of content provider, or can be the gateway server or middle server related to the content provider.

Next, a judgment is made in step S210 to determine whether a sender of the contents or a recipient of the contents is a known suspected person. The judgment whether the user (sender or recipient) is the suspected person is conducted in advance based on the following principles: when content is leaked (piracy occurs), the operator detects the fingerprint embedded in the leaked content and finds out the version-of the leaked content and its first level users. Based on the fingerprint identified from the pirated content, the person who holds the version that corresponds to the content related to fingerprint will be determined as suspected persons. The judgment of suspected persons is usually based on the following information recorded by the wireless operator when the user forwards the contents: time/date of forwarding; sender ID and recipient ID; content ID (optionally version ID, the Version ID being used to identify the version of the contents and denote the different versions of contents received by different first level users). If a piece of content is leaked, the operator will detect the embedded fingerprint from the leaked content, and find out the version of the leaked content and its corresponding first level user. Since the operator holds the records of all the forwarding, it is possible to reconstruct the distribution tree of the leaked content. That is to say, it is possible to identify and display all of the users who have received the leaked content and the identified users would be regard as potential leaking person (suspected person).

When it is determined in Step 210 that the sender or recipient of the contents is the suspected person leaking content, the whole process goes to Step 215. Otherwise, if it is determined in Step 210 that neither the sender nor the receiver of the content is the suspected person, the process goes to Step 245 to directly forward said content.

At step S215, the gateway will decrypt the data of the contents to be forwarded.

Next, in Step 220, it is further determined whether the sender is the suspected person. If the answer is "YES", the process goes to Step 225. In this step, for the decrypted content, remove the fingerprint related to the sender from the forwarded content in a way that corresponds to the fingerprint embedding, and then the process goes to Step 230. If the answer of the judgment in Step 220 is "NO", the process goes to Step 230 directly.

In Step 230, it is further determined whether the recipient is the suspected person. If the answer is "YES", the process goes to Step 235. In this step, fingerprint related to the receiver will be embedded in the forwarded content. Then the process goes to Step 240. If the result of the judgment is "NO", the process goes directly to Step 240.

In Step 240, the forwarded contents are encrypted and the encrypted contents are forwarded in Step 245. Thus the process ends.

According to the description of the special tracing process of the present invention, it can be known that: when piracy occurs, firstly based on the record for the previous contents forwarded by the wireless deliver gateway of the operator, the person holding the same version of the pirated content will be determined and said person will be determined as the suspected person. Afterwards, special tracing will be initiated for all contents forwarded to the suspected persons or all contents forwarded by the suspected persons. That is to embed specific fingerprint into or remove specific fingerprint from the protected digital contents being transferred so as to trace the suspected person and thus identify each leaking person. When the suspect pirates again, since the pirated content has the unique fingerprint that relates to said suspect, it is possible to determine the pirate accurately.

It can be observed from the description of FIG. 2, that when executing the method for tracing and identifying the piracy according to FIG. 2, it would be very costly if special tracing is taken on all piracy suspected persons because the embedment and removal of fingerprint will consume some resources of the server. The tracing to all of the users will also lower the performance of the wireless gateway. Therefore, the present invention further puts forward that: prior to the special tracing process, a preliminary screening process is used initially to narrow the range of the suspected persons. Only those highly suspected persons will be traced in the second stage. To the majority of the users, no significant additional work is needed in system operator's side. Thus a great amount of resources is saved.

Reference is made to FIG. 3 in which show a advantageous implementation of a two-stage special tracing method for the suspected persons. The process of the stage 2 in FIG. 3 is the same with that of the FIG. 2, comprising the following:

1) When a piece of content is distributed or forwarded to the suspected persons, owing to the gateway of the operator or the content provider server, another special fingerprint is embedded in the content, wherein said fingerprint is related to said users (the suspects who receive the protected content);

2) When a piece of content is forwarded by the suspected persons, when the content goes through the operator's gateway, the gateway removes the fingerprint related to the sender from the content so that the recipient can get a "clean copy" without the fingerprint related to the suspect.

Therefore, even after the Super-Distribution process, the suspected person actually can obtain the unique version of the content. Thus, the operator gateway may decide whether the suspected person is a real pirate by comparing similarity of the pirated content and the version held by the suspected person.

The following is the detailed description of the first stage in FIG. 3 with further reference to FIG. 3. That is the primary screening process on the suspected persons based on the advantageous embodiment.

A preliminary screening process is firstly based on the following information recorded by the wireless operator when the content is forwarded by the user: date/time of forwarding; sender ID and recipient ID; content ID (optionally, version ID, the version ID is used to identify version of the content, and denote different versions received by different first level users). If a piece of content is leaked, the operator will detect the fingerprint embedded in the leaked content and find out the version of the leaked content as well as the first level users. Since the operator has the record of all the forwarding, it is possible to reconstruct the distributing tree of the leaked contents. That is, it is possible to identify and display all the users receiving the leaked contents and the identified users therefore would be regarded as suspected persons.

If there exist several pieces of leaked contents with different fingerprints, the content publisher/operator can identify several groups of possible suspected persons and when the leaked contents increase, the operator is able to identify multiple groups of potential suspected persons. Thus based on the occurrence frequency of the suspects, the highly suspected persons can be identified. Of course the policy of identifying suspected persons can be defined flexibly. For example, the policy can be defined in according with the forwarding records of the operator gateway or based on the judgment whether the user holds the pirated version of the content utilizing the recorded information when users apply for authorization. The method for identifying the highly suspected person comprise: determining based on the frequency how much the suspected person holds the leaked version and deduct the suspectability according to the level in which the suspect belongs to during forwarding. It is the target of the primary tracing stage to identify a group of highly suspected persons. Afterwards, the special tracing process is only taken for the highly suspected persons.

For this sake, take the operator gateway for example: when a part of content is forwarded to the highly suspected persons, a specific second fingerprint is embedded in said content. The second fingerprint will not affect identifying the first fingerprint of the first level users and therefore the suspected person can be exclusively identified. When the highly suspected persons forward the content, the second fingerprint will be removed from the content so that the recipient can get a "clean copy" without the information of the second fingerprint. Therefore, the highly suspected persons actually receive a unique version of the content. When the second tracing stage is adopted, if the other leaked content also comprises the second fingerprint, the operator can make sure which highly suspected person is the leaking point. Thus the accurate tracing and identifying for the pirate is achieved.

As the second stage tracing is only taken on the highly suspected persons, to the majority of the ordinary users, there is no significant additional work is needed at the side of the system operator, thus saving a lot of resources.

While the invention has been described with respect to illustrative embodiments thereof, it will be understood that various changes and modification can be made to the invention herein envisaged without departing from the scope and teaching of the present invention. Accordingly, the described embodiment is to be considered merely exemplary and the present invention is not to be limited to except as specified in the attached claims.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Methods of this invention may be implemented by an apparatus which provides the functions carrying out the steps of the methods. Apparatus and/or systems of this invention may be implemented by a method that includes steps to produce the functions of the apparatus and/or systems.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for use in a wireless digital rights management system, wherein a content provider delivers protected digital content, comprising:

when unauthorized holding of a pirated copy of the protected digital content is detected, based on the gateway controlling ability of a wireless operator within the wireless digital right management system, embedding in or removing from a specific fingerprint the protected digital content so as to trace suspected persons and further identify a pirate, wherein said specific fingerprint being related to the information about a suspected person who holds the protected digital content without authorization;

when the wireless gateway in which the content provider is located or to which the content provider is related, receives the protected digital content to be forwarded, judging whether a sender or a recipient of the forwarded content is the suspected person based on whether the sender or recipient of the forwarded content once held a corresponding version of the pirated digital content;

when the recipient of the digital content is a suspected person, the gateway in which the content provider is located or to which the content provider is related, embedding a fingerprint in the digital content, wherein said fingerprint is related to said suspected person as the recipient;

when the sender of the forwarded digital content is a suspected person, the gateway in which the content provider is located or to which the content provider is related removing the embedded fingerprint from the digital content, wherein said fingerprint being related to the suspected person as the sender; and identifying the pirate who leaks the content based on tracing the content version that contains the fingerprint related to the suspected person.

2. A method according to claim 1, wherein the step of judging whether the sender or recipient of the forwarded content is the suspected person further comprises:

screening all suspected persons holding pirated digital content to determine at least one highly suspected person most likely to leak the digital content.

3. A method according to claim 2, further comprising:
singling out highly suspected persons from the suspected persons who hold the pirated digital content based on a frequency of said highly suspected persons holding various different versions of the pirated content.

4. A method according to claim 2, further comprising establishing different suspect-ability level in accordance with a forwarding path level in which each suspected person is located, so as to determine the highly suspected persons from among suspects who hold the pirated digital content.

5. A method according to claim 1, further comprising:
identifying and displaying users who receive the unauthorized digital content based upon one of: a forwarding record of the operator gateway when users forward the content, and a historical record of the users for requesting authorization, and identified users being identified as suspected persons.

6. A method according to claim 5, further comprising: identifying the suspected person by the operator gateway based on the record of unauthorized distribution of content recorded by gateway when users forward content, wherein said record comprising:
time/date of forwarding the digital content;
sender ID and recipient ID; and
content ID.

7. A method according to claim 1, further comprising:
detecting the fingerprint embedded in the pirated digital content by the content provider and thus determining the version of the pirated content and the first level users, wherein said first level users being the users who directly obtain right from the content provider to use the digital content.

8. A method according to claim 1, further including a step of determining whether the suspected person is a real pirate through comparing the similarity of the pirated content and the version held by the suspected person.

9. An apparatus for use in a wireless digital rights management system, wherein a content provider delivers protected digital content, comprising:
means for detecting when unauthorized holding of a pirated copy of the protected digital content;
based on the gateway controlling ability of a wireless operator within the wireless digital right management system, means for embedding in or removing from a specific fingerprint the protected digital content so as to trace suspected persons and further identify a pirate, wherein said specific fingerprint being related to the information about a suspected person who holds the protected digital content without authorization;
means for receiving the protected digital content to be forwarded, when the wireless gateway in which the content provider is located or to which the content provider is related;
means for judging whether a sender or a recipient of the forwarded content is the suspected person based on whether the sender or recipient of the forwarded content once held a corresponding version of the pirated digital content;
means for embedding a fingerprint in the digital content, wherein said fingerprint is related to said suspected person as the recipient, when the recipient of the digital content is a suspected person, the gateway in which the content provider is located or to which the content provider is related;
means for removing the embedded fingerprint from the digital content, wherein said fingerprint being related to the suspected person as the sender, when the sender of the forwarded digital content is a suspected person, the gateway in which the content provider is located or to which the content provider is related; and
means for identifying the pirate who leaks the content based on tracing the content version that contains the fingerprint related to the suspected person.

10. An apparatus according to claim 9, wherein the means for judging whether the sender or recipient of the forwarded content is the suspected person further comprises:
means for screening all suspected persons holding pirated digital content to determine at least one highly suspected person most likely to leak the digital content.

11. An apparatus according to claim 10, further comprising:
means for singling out highly suspected persons from the suspected persons who hold the pirated digital content based on a frequency of said highly suspected persons holding various different versions of the pirated content.

12. An apparatus according to claim 10, further comprising means for establishing different suspect-ability level in accordance with a forwarding path level in which each suspected person is located, so as to determine the highly suspected persons from among suspects who hold the pirated digital content.

13. An apparatus according to claim 9, further comprising:
means for identifying and displaying users who receive the unauthorized digital content based upon one of: a forwarding record of the operator gateway when users forward the content, and a historical record of the users for requesting authorization, and identified users being identified as suspected persons.

14. An apparatus according to claim 13, further comprising: means for identifying the suspected person by the operator gateway based on the record of unauthorized distribution of content recorded by gateway when users forward content, wherein said record comprising:
time/date of forwarding the digital content;
sender ID and recipient ID; and
content ID.

15. An apparatus according to claim 9, further comprising:
means for detecting the fingerprint embedded in the pirated digital content by the content provider and thus determining the version of the pirated content and the first level users, wherein said first level users being the users who directly obtain right from the content provider to use the digital content.

16. An apparatus according to claim 9, further including means for determining whether the suspected person is a real pirate through comparing the similarity of the pirated content and the version held by the suspected person.

17. A computer program product for use in a wireless digital rights management system, wherein a content provider delivers protected digital content, the computer program product comprising:
a computer usable medium having computer usable program code embodied herewith, the computer usable program code comprising computer usable program code configured to:
when unauthorized holding of a pirated copy of the protected digital content is detected, based on the gateway controlling ability of a wireless operator within the wireless digital right management system, embedding in or removing from a specific fingerprint the protected digital content so as to trace suspected persons and further identify a pirate, wherein said specific fingerprint being related to the information about a suspected person who holds the protected digital content without authorization;

when the wireless gateway in which the content provider is located or to which the content provider is related, receives the protected digital content to be forwarded, judging whether a sender or a recipient of the forwarded content is the suspected person based on whether the sender or recipient of the forwarded content once held a corresponding version of the pirated digital content;

when the recipient of the digital content is a suspected person, the gateway in which the content provider is located or to which the content provider is related, embedding a fingerprint in the digital content, wherein said fingerprint is related to said suspected person as the recipient;

when the sender of the forwarded digital content is a suspected person, the gateway in which the content provider is located or to which the content provider is related removing the embedded fingerprint from the digital content, wherein said fingerprint being related to the suspected person as the sender; and identifying the pirate who leaks the content based on tracing the content version that contains the fingerprint related to the suspected person.

18. A computer program product according to claim 17, wherein the step of judging whether the sender or recipient of the forwarded content is the suspected person further comprises:

screening all suspected persons holding pirated digital content to determine at least one highly suspected person most likely to leak the digital content.

19. A computer program product according to claim 18, further comprising:

singling out highly suspected persons from the suspected persons who hold the pirated digital content based on a frequency of said highly suspected persons holding various different versions of the pirated content.

20. A computer program product according to claim 18, further comprising establishing different suspect-ability level in accordance with a forwarding path level in which each suspected person is located, so as to determine the highly suspected persons from among suspects who hold the pirated digital content.

* * * * *

UNITED STATES PATENT AND TRADEMARK OFFICE
CERTIFICATE OF CORRECTION

PATENT NO. : 7,653,940 B2
APPLICATION NO. : 11/211804
DATED : January 26, 2010
INVENTOR(S) : Luo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1189 days.

Signed and Sealed this

Twenty-third Day of November, 2010

David J. Kappos
*Director of the United States Patent and Trademark Office*